United States Patent [19]

Brezosky

[11] 4,290,660
[45] Sep. 22, 1981

[54] MOVABLE TOEKICK FOR CONVERTIBLE DISHWASHER

[75] Inventor: Bernard J. Brezosky, Louisville, Ky.

[73] Assignee: General Electric Company, Louisville, Ky.

[21] Appl. No.: 99,261

[22] Filed: Dec. 3, 1979

[51] Int. Cl.³ .................... A47B 77/08; A47B 91/00
[52] U.S. Cl. .................... 312/253; 312/250; 312/311; 312/317 R; 312/293
[58] Field of Search ............ 312/253, 311, 250, 205, 312/204, 214, 292, 293, 257 A, 257 SK, 276, 317 R; 248/498

[56] References Cited

U.S. PATENT DOCUMENTS

| | | | |
|---|---|---|---|
| 127,778 | 6/1872 | Lehmann | 312/205 |
| 1,080,074 | 12/1913 | Riek | 312/293 |
| 2,295,915 | 9/1942 | Ring | 312/257 SK |
| 2,490,588 | 12/1949 | Frie et al. | 312/250 |
| 2,801,895 | 8/1957 | Gass | 312/257 SK |
| 3,055,723 | 9/1962 | Hildebrand, Sr. | 312/250 |
| 3,393,950 | 7/1968 | Dutcher et al. | 312/276 |
| 3,628,841 | 12/1971 | Sulcer | 312/311 |
| 3,645,594 | 2/1972 | Cintz | 312/100 |
| 3,905,663 | 9/1975 | Bergeson | 312/250 |
| 3,912,350 | 10/1975 | Gurubatham | 312/317 R |

FOREIGN PATENT DOCUMENTS

| | | | |
|---|---|---|---|
| 942766 | 4/1956 | Fed. Rep. of Germany | 248/498 |
| 2746604 | 4/1979 | Fed. Rep. of Germany | 312/253 |

*Primary Examiner*—Victor N. Sakran
*Attorney, Agent, or Firm*—H. Neil Houser; Radford M. Reams

[57] ABSTRACT

A movable toekick panel is utilized in a front loading dishwasher in substitution of the usual immobile toekick panel. The disclosure is directed to a decorative toekick panel for a dishwasher which utilizes a stabilizing support structure that advances relatively forward of the dishwasher when the dishwasher is moved rearwardly. A pivotal or flexible toekick panel is described which swings forward with the advance of the horizontally rotatable casters or other front supports of the dishwasher as the dishwasher is moved rearwardly. The caster can be positioned further forward under the dishwasher than conventional casters with such a movabe toekick panel.

A method for assembly of the toekick panel is also disclosed.

11 Claims, 9 Drawing Figures

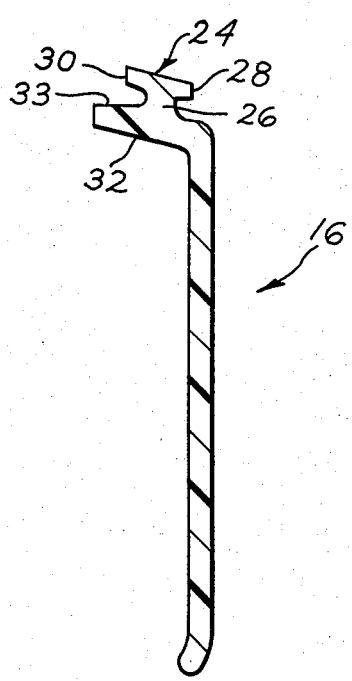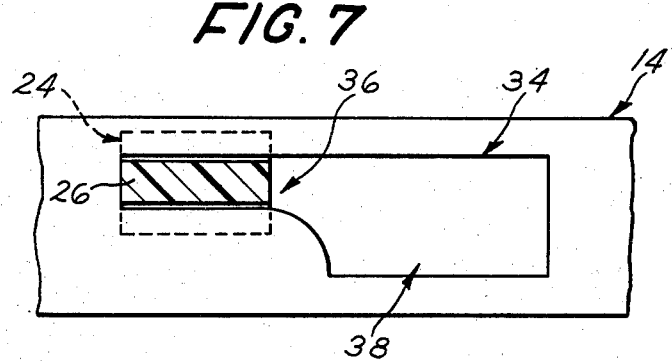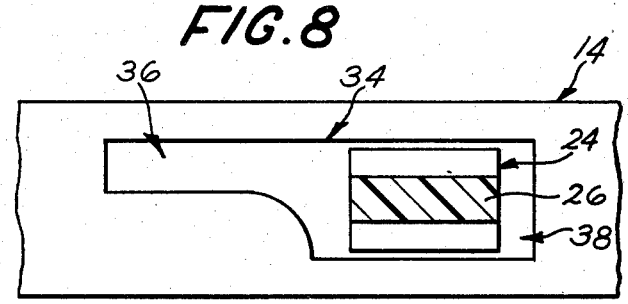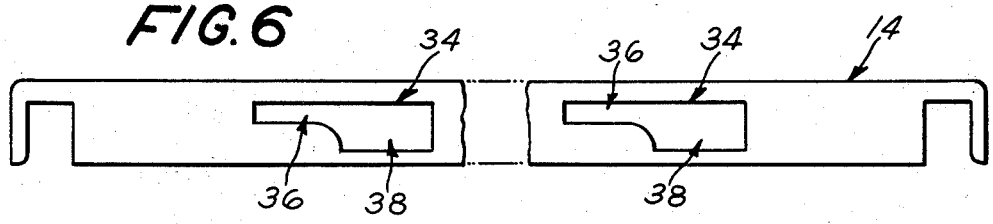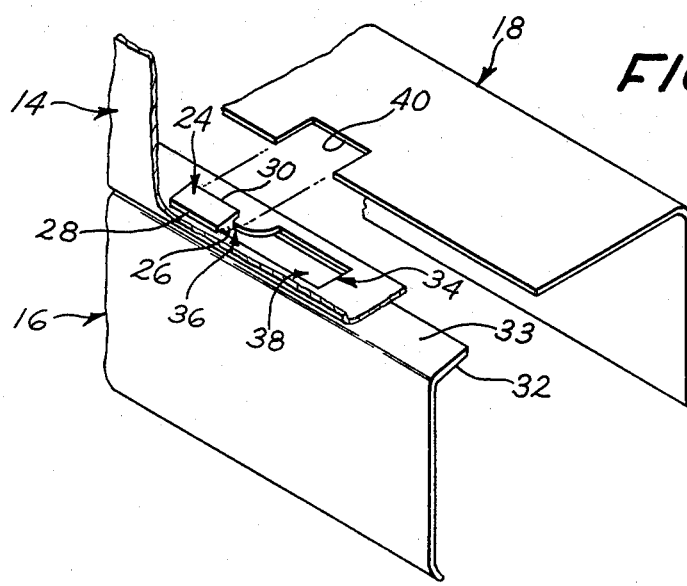

MOVABLE TOEKICK FOR CONVERTIBLE DISHWASHER

BACKGROUND OF THE INVENTION

This invention is directed to domestic appliances, such as convertible dishwashers, of the type which may be left in a free standing position, unattached to any structural components. Such convertible dishwashers are generally self supporting and rely entirely on the span between their support legs or casters to provide sufficient stability to balance the center of gravity of the dishwasher on its support members. The stability of these convertible dishwashers is dependent upon the overall size of the dishwasher unit and becomes a compromise of the large size needed for stability and the compactness needed to provide for the ease of location and storage of a convertible dishwasher.

Stability of convertible dishwashers is further affected by the off balance weight created when the door of a front loading dishwasher is opened and weight is applied to the door in its horizontal position. Such weight can be supplied by the withdrawal of the loaded lower dish rack to a position of full extension on the open door, or by the placement of the weight of the operator, or a child, on the open door by accident. Weight applied to the open dishwasher door operates against the weight of the dishwasher unit itself with the mechanical advantage of the leverage provided by the dishwasher door in its horizontal position.

In order to meet minimum standards of stability set by the Underwriters Laboratory, convertible dishwashers must remain in a stable, upright position under the stress of a 50-pound weight applied downwardly on the end of the opened door.

Attempts have been made to provide stability to convertible dishwashers by the utilization of heavier components in the dishwashers than are acceptable. Such weight increases provide additional stability at the expense of the ease of movement of the overall dishwasher unit. Increased cost of transportation of the units is also experienced by such a solution to the stability problem.

Other convertible dishwashers have been designed with the center of gravity shifted to the rear by movement of the front support members to a position in front of the pivot point of the dishwasher, which is the point where, conventionally, the front supports are located. The disadvantages of moving the front support members forward are that the support members are then exposed to view and the standard low cost support member is generally unattractive to the consumer. The alternatives are to use more expensive, attractive support members or to provide a shroud or nose piece which extends out past the extended support members and beyond the front plane of the closed dishwasher unit. The latter alternative is expensive, requires an additional manufacturing step and provides a dishwasher which has additional bulk and storage requirements.

Yet another method of providing stability to front loading convertible dishwashers is to provide articulating support members in addition to the main front supports. These members project outwardly and downwardly from the dishwasher upon movement of the dishwasher door from its closed vertical position to its open horizontal position. This method of providing stability to the open dishwasher incurs a large manufacturing expense and suffers from high service requirements. It also provides an apparent lack of quality due to the noise and moving components required to provide such articulating support members, as well as the requirement to provide accurate movement of the articulating support in a compound movement through a horizontal and vertical plane.

The patented prior art has recognized the problem of instability in dishwashers and the attendant problem of providing an attractive exterior to the functional designs created to increase dishwasher stability. This art is discussed below.

In U.S. Pat. No. 3,905,663, assigned to The Maytag Company, Bergeson discloses a convertible dishwasher which is designed to overcome stability problems by providing alternative mounting positions for the drive motor depending on whether the dishwasher is used as a free standing unit, wherein the motor is mounted at the rear of the unit to counterbalance the door, or as an installed unit, wherein the drive motor is mounted at the front of the unit so as to provide service access to same. In addition, this patent positions the front casters beyond the plane of the dishwasher front panel so as to create a greater floor space and, therefore, increase the unit's stability. A caster cover is provided over the exposed and projecting front casters to at least partially cover said casters. Such a construction requires a permanent projection of the caster cover into the floor space immediately adjacent the front of the dishwasher unit.

In U.S. Pat. No. 3,912,350 assigned to Whirlpool Corp., Gurubatham describes an anti-tip mechanism for a free standing cabinet, such as a dishwasher. The mechanism includes a movable vertical panel which is maintained in a coplanar position with the front of the unit when the cabinet door is closed and is placed in a forwardly articulated position upon opening of the door. The vertical panel of the anti-tip mechanism has depending support legs which contact the floor when the panel for the anti-tip mechanism is in the forwardly extended position. Such an articulating mechanism requires considerable additional expense in manufacturing and results in a noisier, vibrational operation.

U.S. Pat. No. 3,393,950, assigned to Whirlpool, discloses a similar articulating support panel which is directly pivoted to the access door of an appliance cabinet so as to move through a horizontal and vertical path to provide support for the opened access door.

The art also recognizes other applications of the movable and pivotal panel in a cabinet structure such as U.S. Pat. No. 127,778; U.S. Pat. No. 1,080,074; and U.S. Pat. No. 3,645,594.

These attempts to overcome the stability problem of convertible dishwashers have a number of disadvantages as outlined above; namely, increased weight and costs, unattractive appearance, and lack of apparent quality due to mechanical movement of the stabilizers in compound movements.

SUMMARY OF THE INVENTION

The present invention is directed to an inexpensive, attractive toekick panel used in conjunction with a pair of front support members which are pivotally mounted just inside the forward plane of the dishwasher. This placement of the support members provides the desired dishwasher stability; however, when oriented outwardly the front support members project beyond the forward plane of the dishwasher. The toekick panel provides an attractive cover for these support members.

More specifically, the present invention is directed to a toekick panel which is attached to the dishwasher cabinet so as to rotate upwardly and outwardly when the forwardly placed support members of the dishwasher rotate outwardly. Such movement generally results from rearward travel of the convertible dishwasher. Upon the movement of the dishwasher in the sideways or forward direction, the relatively epicentrically rotatable support members generally assume a relatively retracted position and the toekick panel assumes a substantially vertical depending orientation or position.

In a preferred embodient of the invention, the toekick panel is pivotally attached to the lower edge of the service access panel of a convertible dishwasher by a pivot assembly comprising pivot members located in the top horizontal edge of the toekick panel and asymmetric pivot apertures in the lower horizontal edge of the service access panel designed to accept, and movably hold, the toekick panel pivot members.

In an alternative embodiment, the toekick panel is fabricated of a ductile material such as plastic, rubber or thin metal. The toekick panel is then secured directly to the lower edge of a service access panel and advances in a swinging motion by the flexing of the panel in response to the contact of the advancing support members which are rotatably affixed to the dishwasher.

BRIEF DESCRIPTION OF THE DRAWINGS

FIG. 5 is a vertical cross-sectional view of the toekick panel of the present invention taken along the line 5—5 of FIG. 2;

FIG. 6 is a bottom view of the service panel of the dishwasher of FIG. 1;

FIG. 7 is a partial bottom view of the service panel apertures and the toekick panel pivot members taken along the line 7—7 in FIG. 4;

FIG. 8 is a partial bottom view of the service panel apertures and the toekick panel pivot members of FIG. 7 wherein the pivot members are positioned over the enlarged opening of the service panel apertues;

FIG. 9 is an exploded perspective view taken along line 6—6 of FIG. 1 with portions removed and portions broken away showing the service panel and kickplate of the dishwasher of the present invention.

DESCRIPTION OF THE PREFERRED EMBODIMENT

Figure 1:
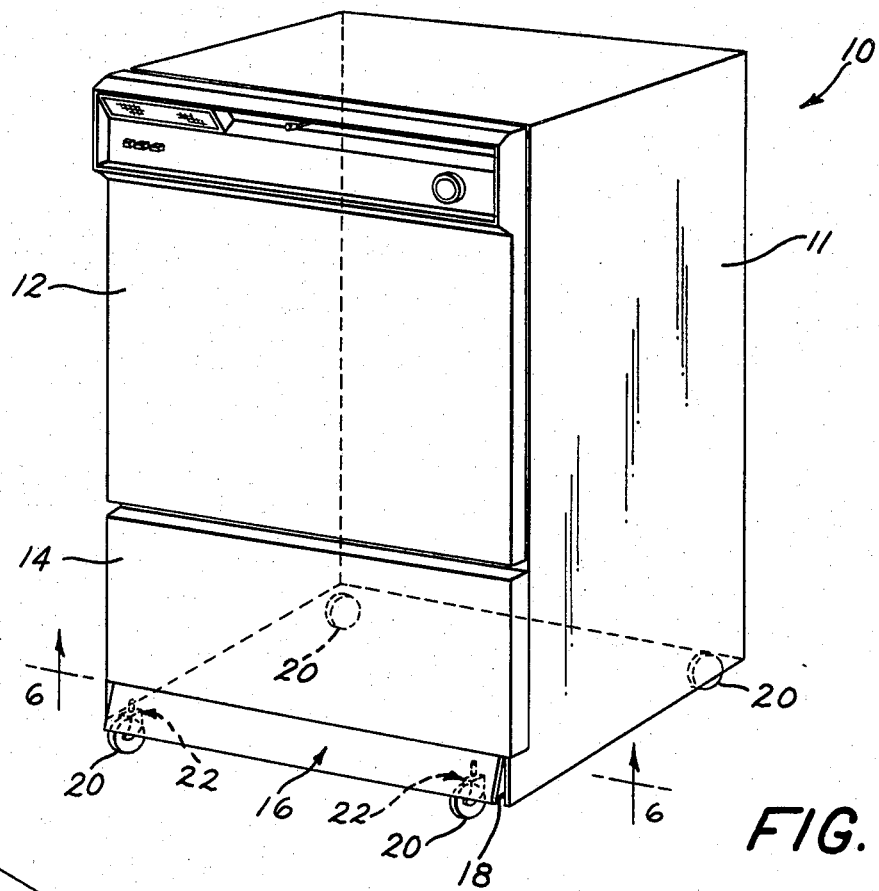
FIG. 1 is a perspective view of a dishwasher incorporating therein the novel aspects of this invention.

In FIG. 1 is shown a convertible dishwasher 10 having a cabinet 11 and a front access door 12 by which entry into the washing compartment of the dishwasher is made. The door is pivotally mounted to open by means of a pivot arm and a horizontal pivot pin.

Immediately below the pivot of the dishwasher door is the service access panel 14 of the dishwasher by which access can be made to the mechanical drive apparatus of the dishwasher which is located below the wash tub.

The service access panel 14 is rigidly affixed to the dishwasher cabinet at the frame of the dishwasher near the access door pivot pin and at its lower end to the caster kickplate 18. In turn, the caster kickplate is fastened to the main body of the dishwasher cabinet. The front of the dishwasher cabinet is supported at its lower end with the horizontally rotatable front support members 22 which, together with the rear support members, provide a rigid support for the dishwasher unit.

The rotatable support members which are provided consist of relatively articulating front casters 20. These casters are located in front of the caster kickplate 18 and are rotatably affixed to the caster kickplate 18 and relatively advance forwardly when the dishwasher is moved rearwardly due to the off-center placement of the caster about its horizontal center of rotation.

Figure 3:
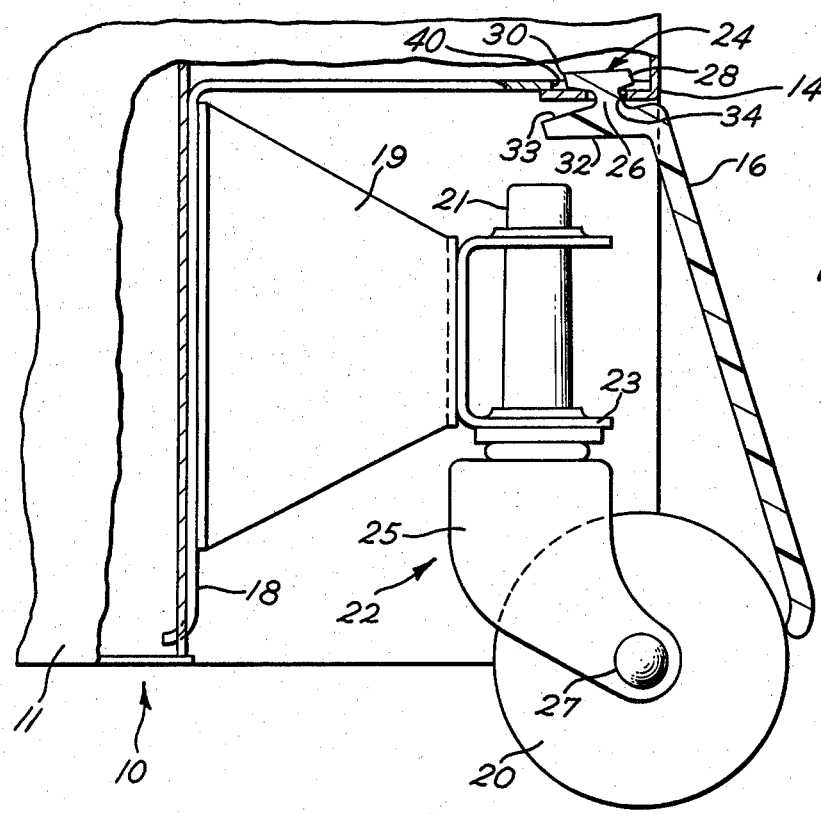
FIG. 3 is a partial vertical cross-sectional view of the outwardly pivotal toekick panel and the rotationally extended support member of the dishwasher of FIG. 1.
Figure 4:
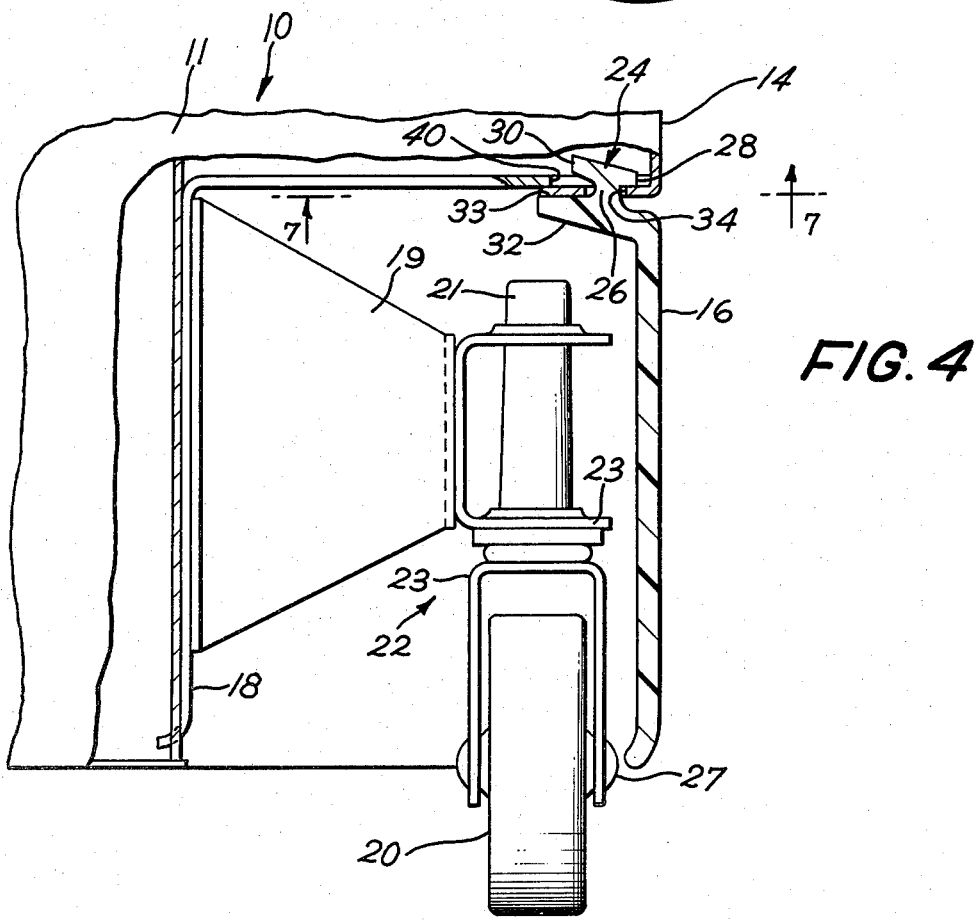
FIG. 4 is a partial vertical cross-sectional view of the toekick panel in retracted position and the rotationally retracted support member of the dishwasher of FIG. 1.

As best seen in FIGS. 3 and 4, the casters 20 are affixed to a roller fork 25 in an off-center alignment with respect to the stub shaft 21. This alignment creates an epicentric rotation of the caster 20 about its axis of horizontal rotation so that the caster is capable of intersecting the front plane of the cabinet. The stub shaft 21 is held in an axle fork 23. The axle fork 23 is secured to the front of the caster kickplate by a caster bracket 19. The caster 20 itself rotates on its axle 27.

The dishwasher 10 is supported at its rear portion in a similar manner by rear support members, shown as rear casters 20. This combination of fixed and rotatable support members, shown as casters, provides for rigid, firm support of the dishwasher unit, while at the same time allowing for movement of the convertible dishwasher unit when it is not in a fixed or permanent installation.

A free hanging toekick panel 16 is attached to the lower edge of the service access panel 14 so that the toekick panel 16 completes the lower end of the front vertical plane of the dishwasher cabinet. The toekick panel 16 is situated immediately in front of the rotatable front casters 20 and covers said casters from view in their relatively retracted position.

The toekick panel is pivoted forward to provide clearance for the forwardly rotatable casters by means of direct contact of the casters with the back edge of the toekick panel, when the rotatable front casters 20 are extended in their forward position beyond the vertical plane of the dishwasher cabinet.

Figure 2:
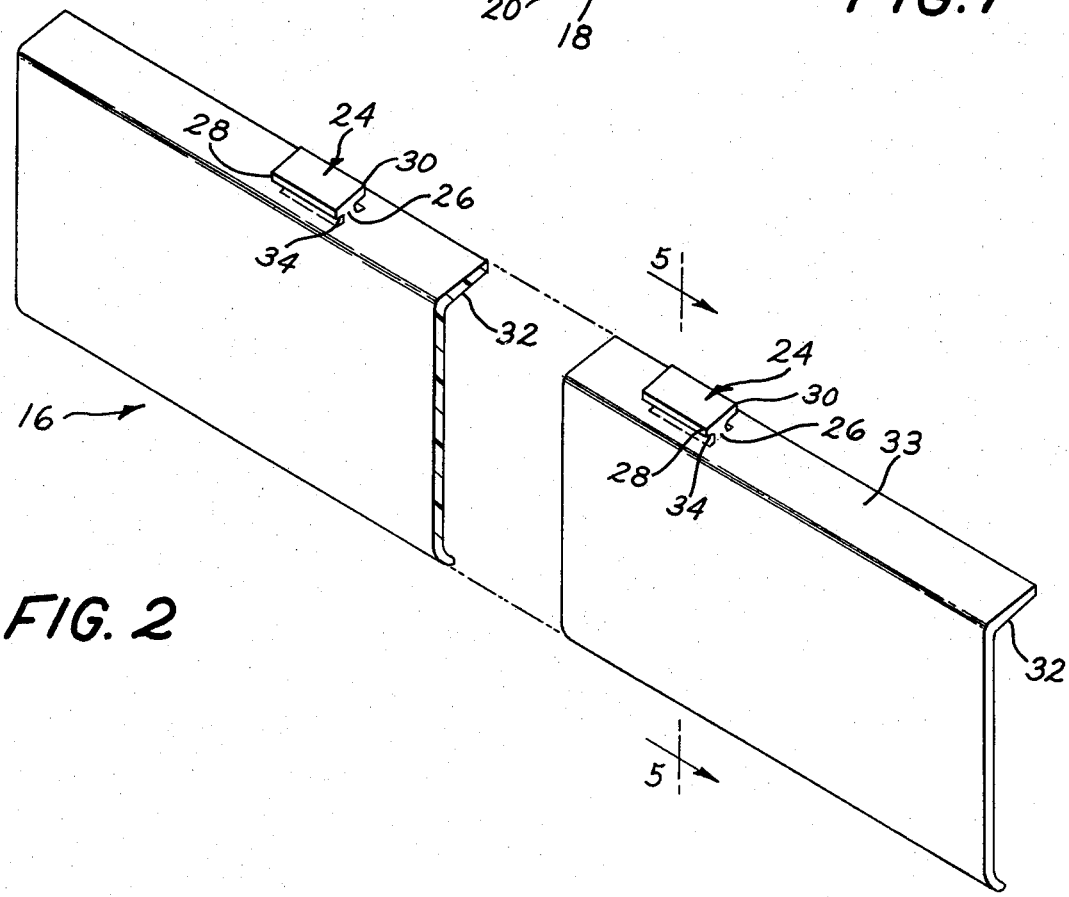
FIG. 2 is a broken perspective view of the toekick panel employed in the dishwasher of FIG. 1.

FIG. 2 shows the toekick panel 16 separately from the dishwasher cabinet 11. The toekick panel is a rectangular metal panel with slightly turned in upper and lower edges. The upper edge forms a shelf 32. Two male pivot members 24 are affixed to the upper surface of said shelf.

As shown in FIGS. 3 and 4, movement of the toekick panel 16 is facilitated by the suspension of the panel 16 from the service access panel 14 by a pivot assembly comprising two male pivot members 24 affixed to the upper edge of the toekick panel and two pivot apertures 34 in the lower edge of the service access panel. The pivot members 24 are pivotably engaged in the pivot apertures 34 in the lower edge of the service access panel 14. The pivot axis 26 of the pivot member 24 is rearward of the main plane of the toekick panel 16 to insure that the toekick panel always rests in the vertical plane of the dishwasher when the front casters are rotated into the relatively retracted position.

Each male pivot member 24 consists of a narrow elongated pivot axis which joins front pivot ledge 28 and the horizontally expanded rear pivot ledge 30 to the toekick panel shelf 32. In cross-section, FIG. 5, the pivot member 24 creates a generally "T" shaped member which is viewed in FIG. 2 as a relatively elongated member. The shelf 32 and the front and rear ledges 28, 30 of the pivot member are canted at an angle to the horizontal plane with their lowermost point at the front, FIG. 4. This structure prevents rearward pivotal movement of the panel 16 past the vertical plane, yet allows limited forward movement of the panel 16 in order to accommodate the rotationally extendable front casters 20 during their extension in conjunction with the rearward travel of the dishwasher.

The panel is prevented from more rearward movement because of the toekick panel shelf 32, which extends from the front panel surface to a point considerably behind the pivot axis 26. By the use of shelf surface 33 of shelf 32 and the lower edge of the front pivot ledge 28 acting against the lower edge of the service access panel 14, a maximum rearward position of the toekick panel is defined.

Likewise, forward pivotal movement of the toekick panel 16 is limited by the lower edge of the rear pivot ledge 30 and the upper front edge of the toekick panel shelf 32. Greater pivotal movement of the toekick panel 16 in the forward direction is allowed than that permitted in the rearward direction, because of the canted attitude of the shelf 32 and the pivot member 24. The rearward movement optimally would stop at the rest, or vertical, position of the toekick; see FIG. 5.

Two of the positions which the front casters 20 can attain are shown in FIGS. 3 and 4. FIG. 3 shows the rotationally extended position of the casters, such as takes place in rearward movement of the dishwasher 10. FIG. 4 is exemplary of the position of the front casters 10 when they are rotated to a relatively retracted position such as during the sideward movement of the dishwasher 10. The design of the toekick panel is an outwardly pivotable cover for the front casters enables the casters to be positioned sufficiently forward of the conventional support member position to provide increased stability of the dishwasher when the door 12 is open, without the use of complex articulating members which are mechanically linked to the door for movement.

In FIG. 6, the lower edge of the service access panel 14 is shown, wherein two pivot apertures 34 are provided to engage the male pivot members 24 of the toekick panel. The panel apertures 34 consist of relatively enlarged pivot engagement slots 38 by which the pivot members 24 of the toekick panel 16 are inserted into the service access panel 14, and relatively small or reduced pivot retaining slots 36 immediately adjacent and contiguous with the engagement slots 38 by which the toekick panel 16 is hingedly attached to the service access panel. This allows the toekick panel to freely swing from a vertical position to a forwardly pivoted position.

In order to insert the male pivot members 24 of the toekick panel 16 into the pivot apertures 34 of the service access panel 14, the toekick panel and pivot members are aligned with the enlarged engagement slot 38, inserted therein as shown in FIG. 8, and then slid over to the final position in the pivot retaining slot 36 as shown in FIGS. 7 and 9. Slots 40 are provided in kickplate 18 which align with the reduced pivot retaining slots 36 in service access panel 14. when fully assembled. As best seen in FIG. 9, slots 40 capture the male pivot members 24 of toekick panel 16 to prevent lateral movement of the toekick panel relative to the kickplate. The order of assembly for this arrangement calls for insertion of male pivot members 24 of toekick panel 16 into the reduced pivot retaining slots 36 in service access panel 14, followed by attachment of service access panel 14 to kickplate 18.

In an alternate embodiment, the toekick panel 16 may be fabricated of a flexible material such as plastic, rubber, or thin metal. The toekick panel would then be fastened to the lower edge of the service access panel in a rigid manner and would merely flex outwardly and upwardly upon being contacted by the forwardly rotated front casters, during rearward movement of the dishwasher.

Although the invention is described by particular reference to the illustrative embodiments of a convertible dishwasher, the invention is applicable to other domestic appliances, and changes and modifications which are readily apparent to those skilled in the art are intended to be within the scope of the invention as claimed herein.

I claim:

1. A movable toekick arrangement for a domestic appliance having a cabinet, and an access door at the front of the cabinet, said arrangement comprising:
   support members mounted to the cabinet near the front thereof and rotatable between a forward position and a rearward position, in the forward position said support members intersecting the vertical plane of the front of the cabinet;
   a toekick panel movably mounted to the cabinet at the lower front thereof for pivotal movement between a first position generally in the frontal plane of the cabinet and a second position projecting outwardly and upwardly from the cabinet at an angle to the frontal plane, said panel being operative to substantially hide said support members from view;
   said support members being operative to engage said toekick panel in its first position and to pivotally move said toekick panel to its second position as said support members rotate from their rearward position to their forward position.

2. The moveable toeckick arrangement of claim 1 further comprising pivot means for mounting said toekick panel to said cabinet for pivotal movement between its first and second positions.

3. The movable toekick arrangement of claim 1 further comprising a service access panel mounted to the cabinet below the access door and pivot means for mounting said toekick panel to the lower edge of said service access panel for depending pivotal movement between its first and second positions.

4. The movable toekick arrangement of claim 3 wherein said service access panel includes in its lower edge a pivot aperture and said pivot means for dependingly connecting the toekick panel to the service access panel comprises a male pivot member projecting from the top edge of said toeckick panel, said male pivot member being pivotally engaged in said pivot aperture.

5. The movable toekick arrangement of claim 4 wherein said male pivot member has a generally "T" shaped cross-section.

6. The movable toeckick arrangement of claim 5 wherein the pivot aperture of the service access panel comprises a relatively large pivot engagement slot in which the male pivot member of the toekick panel is inserted and a relatively small pivot retaining slot adjoining the engagement slot wherein the male pivot member is slid from the engagement slot to the retaining slot for retention for pivotal movement.

7. The movable toekick arrangement of claim 5 wherein the pivot axis of the male pivot member is rearward of the plane of the toekick panel.

8. The movable toekick arrangement of claim 7 wherein the male pivot member has a front pivot ledge and a rear pivot ledge which are canted at an angle to the horizontal plane.

9. The movable toekick arrangement of claim 8 wherein said support members comprise casters.

10. A movable toekick arrangement for a domestic appliance having a cabinet, and an access door at the front of the cabinet, said arrangement comprising:
   support members mounted to the cabinet near the front thereof and rotatable between a forward position and a rearward position, in the forward position said support members intersecting the vertical plane of the front of the cabinet;
   a toekick panel formed of a flexible material and rigidly mounted to the cabinet at the lower front thereof for flexing movement between a first position generally in the frontal plane of the cabinet and a second position projecting outwardly from the cabinet at an angle to the frontal plane, said panel being operative to substantially hide said support members from view;
   said support members being operative to engage said toekick panel in its first position and to move said toekick panel, by flexing of the panel itself, to its second position as said support members rotate from their rearward position to their forward position.

11. A pivotable toekick arrangement for a domestic appliance having a cabinet with an access door at the front of the cabinet, said arrangement comprising:
   casters mounted to the cabinet near the front thereof and rotatable between a forward position and a rearward position, in the forward position said casters intersecting the vertical plane of the front of the cabinet;
   a toekick panel pivotally attached to the cabinet at the lower front thereof for pivotal movement between a first vertical position generally in the frontal plane of the cabinet and a second canted position projecting outwardly and upwardly from the cabinet at an angle to the frontal plane, said panel being operative to substantially hide said casters from view;
   a pivot assembly comprising two male pivot members, having generally "T" shaped cross-sections, which are affixed to the upper edge of said toekick panel and two pivot apertures situated in the lower front of the appliance cabinet, wherein said male pivot members are pivotally engaged in said pivot apertures to pivotally support said toekick panel on said cabinet;
   said casters being operative to engage said toekick panel in its first position and to pivotally move said toekick panel to its second position as said casters rotate from their rearward position to their forward position.

* * * * *